United States Patent
Josephson

(10) Patent No.: US 12,016,358 B2
(45) Date of Patent: Jun. 25, 2024

(54) COMPOSITION COMPRISING TASTE MODULATION COMPOUNDS, THEIR USE AND FOODSTUFF COMPRISING THEM

(71) Applicant: V. MANE FILS, Le Bar sur Loup (FR)

(72) Inventor: Dave Josephson, Lebanon, OH (US)

(73) Assignee: V. MANE FILS, Le Bar sur Loup (FR)

( * ) Notice: Subject to any disclaimer, the term of this patent is extended or adjusted under 35 U.S.C. 154(b) by 504 days.

(21) Appl. No.: 15/749,996

(22) PCT Filed: Aug. 5, 2016

(86) PCT No.: PCT/IB2016/001272
§ 371 (c)(1),
(2) Date: Feb. 2, 2018

(87) PCT Pub. No.: WO2017/025804
PCT Pub. Date: Feb. 16, 2017

(65) Prior Publication Data
US 2018/0228192 A1     Aug. 16, 2018

Related U.S. Application Data

(60) Provisional application No. 62/202,542, filed on Aug. 7, 2015.

(51) Int. Cl.
*A23L 27/00* (2016.01)
*A23L 2/56* (2006.01)
(Continued)

(52) U.S. Cl.
CPC ............... *A23L 27/88* (2016.08); *A23L 2/56* (2013.01); *A23L 23/00* (2016.08); *A23L 23/10* (2016.08);
(Continued)

(58) Field of Classification Search
CPC .......... A23L 27/88; A23L 27/50; A23L 23/10; A23L 27/63; A23L 27/36; A23L 27/37;
(Continued)

(56) References Cited

U.S. PATENT DOCUMENTS

| 4,096,158 A | 6/1978 | Evers et al. |
| 4,917,913 A | 4/1990 | Buckholz, Jr. et al. |

(Continued)

FOREIGN PATENT DOCUMENTS

| CA | 821490 | 8/1969 |
| JP | 03047899 A | * 2/1991 |

(Continued)

OTHER PUBLICATIONS

Minfie, K. 2011. "Simple Hot Cocoa for One." Downloaded Apr. 8, 2020, from https://www.epicurious.com/recipes/food/views/simple-hot-cocoa-for-one-369469.*

(Continued)

*Primary Examiner* — Vera Stulii
(74) *Attorney, Agent, or Firm* — B. Aaron Schulman, Esq.; Stites & Harbison, PLLC

(57) ABSTRACT

Flavour modifying composition comprising one or more flavour modifying compounds of Formula I, product comprising said flavour modifying composition, use of said flavour modifying composition for modifying taste perception in foodstuffs and beverages and method of improving taste perception in a foodstuff or beverage comprising adding said flavour modifying composition to said foodstuff or beverage.

20 Claims, 1 Drawing Sheet

| Molecule | Benchtop Validation of Taste Modulation (applications tested) |||||||||||
|---|---|---|---|---|---|---|---|---|---|---|---|
| | Salt |||| Sweet ||||||| Bitterness | Umami |
| | Salt Solution (0.2-1.0%) | Maggi (10%-100%) | Kikkomen Soy Sauce (10%-100%) | Cheese sauce (100%) | Sucrose Soluton (2-8%) | Sucralose Solution (150-300 ppm) | Reb-A Solution (150-300 ppm) | Coke Life (100%) | Sprite ZERO (100%) | Dark Chocolate | Maggi (10%-100%) |
| Pantolactone - dihydro-3-hydroxy-4,4-dimethyl-2(3H)-Furanone | Y | Y | Y | Y | Y | Y | Y | Y | Y | Y | Y |
| Dihydro-5-(hydroxymethyl)-2(3H)-furanone | Y | Y | Y | Y | Y | Y | Y | dnt | dnt | dnt | |
| 2-acetyl butyrolactone | Y | Y | Y | Y | Y | Y | Y | dnt | dnt | Y | Y |
| 3-hydroxy-2-pyrone | dnt | Y | Y | dnt | Y | Y | Y | dnt | dnt | dnt | Y |
| 4,6-dimethyl-alpha-pyrone | Y | Y | Y | Y | Y | Y | Y | dnt | dnt | dnt | Y |
| D-Arabino-1,4-lactone | dnt | Y | Y | dnt | Y | Y | Y | dnt | dnt | dnt | Y |
| 4-hydroxy-6-methyl-2-pyrone | Y | Y | Y | Y | Y | Y | Y | dnt | dnt | dnt | Y |
| 3,4-dihydro-6-methyl-2H-pyran-2-one | Y | Y | Y | Y | Y | Y | Y | dnt | dnt | dnt | Y |
| Dihydroactinidiolide | Y | Y | Y | Y | Y | Y | Y | Y | Y | Y | Y |
| 2-acetyl-2-methyl-gamma butyrolactone | Y | Y | Y | Y | Y | Y | Y | dnt | dnt | dnt | Y | dnt = did not test

(51) Int. Cl.
| | |
|---|---|
| A23L 23/00 | (2016.01) |
| A23L 23/10 | (2016.01) |
| A23L 27/10 | (2016.01) |
| A23L 27/20 | (2016.01) |
| A23L 27/22 | (2016.01) |
| A23L 27/30 | (2016.01) |
| A23L 27/50 | (2016.01) |
| A23L 27/60 | (2016.01) |

(52) U.S. Cl.
CPC .............. *A23L 27/10* (2016.08); *A23L 27/204* (2016.08); *A23L 27/2052* (2016.08); *A23L 27/22* (2016.08); *A23L 27/36* (2016.08); *A23L 27/37* (2016.08); *A23L 27/50* (2016.08); *A23L 27/63* (2016.08)

(58) Field of Classification Search
CPC ........ A23L 23/00; A23L 27/22; A23L 27/204; A23L 2/56; A23L 27/10; A23L 27/2052
See application file for complete search history.

(56) References Cited

U.S. PATENT DOCUMENTS

| | | | |
|---|---|---|---|
| 5,683,737 A | 11/1997 | Erickson et al. | |
| 6,391,364 B1 | 5/2002 | Lindsay | |
| 2002/0090435 A1* | 7/2002 | Dewis .................... | A23L 27/202 426/535 |
| 2006/0099300 A1* | 5/2006 | Andersen ................. | A23G 4/06 426/3 |
| 2010/0233102 A1 | 9/2010 | Krammer et al. | |
| 2013/0115356 A1 | 5/2013 | Gelin et al. | |
| 2013/0136839 A1* | 5/2013 | Putter ....................... | A23L 5/00 426/548 |
| 2013/0330457 A1* | 12/2013 | Jordan .................... | A23C 9/156 426/536 |
| 2014/0220214 A1* | 8/2014 | Le-Thiesse ............. | C07C 47/58 426/538 |

FOREIGN PATENT DOCUMENTS

| | | | | |
|---|---|---|---|---|
| JP | 3068609 | | 7/2000 | |
| JP | 2012070636 | | 4/2012 | |
| JP | 2013039083 | | 2/2013 | |
| WO | WO-2013026699 A1 * | 2/2013 | ............. A23L 27/20 |

OTHER PUBLICATIONS

Bueno, J.E., Peinado, R., Moreno, J., Medina, M., Moyano, L., Zea, L. 2003. "Selection of Volatile Aroma Compounds by Statistical and Enological Criteria for Analytical Differentiation of Musts and Wines of Two Grape Varities." J. Food Sci. vol. 68, pp. 158-163.*
Chen, S., Xu, Y., Qian, M.C. 2013. "Aroma Characterization of Chinese Rice Wine by Gas Chromatography—Olfactometry, Chemical Quantitative Analysis, and Aroma Reconstitution." J. Agric. Food Chem. vol. 61, pp. 11295-11302.*
Bouchez, V., Stasik, I., Beaupere, D., 1997. "Regioselective halogenation of pentono-1,4-lactone. Efficient synthesis of 5-chloro- and 5-bromo-5-deoxy derivatives." Carbohydrate Research, vol. 300. pp. 139-142.*
Roucel, M., Grau, F. 2014. "The Importance of New Molecules in Selective Perfumery." Chemistry and Biodiversity. vol. 11, pp. 1462-1469.*
Xu., L.-L., Han, T., Wu, J.-Z., Zhang, Q.-Y., Zhang, H., Huang, B.-K., Rahman, K., Qin, L.-P., 2009. "Comparative research of chemical constituents, antifungal and antitumor properties of ether extracts of Panax ginseng and its endophytic fungus." Phytomedicine. vol. 16, pp. 609-616.*
Ulrich Krings et al: "Thin-layer high-vacuum distillation to isolate volatile flavour compounds of cocoa powder", European Food Research and Technology; Zeitschrift Fur Lebensmitteluntersuchung und—Forschung A, Springer, Berlin, DE, vol. 223, No. 5, Feb. 14, 2006 (Feb. 14, 2006), pp. 675-681, XP019420493, ISSN: 1438-2385, DOI: 10.1007/500217-006-0252-X table 1.
International Search Report for PCT/IB2016/001272, dated Jan. 23, 2017.
Written Opinion for PCT/IB2016/001272, dated Jan. 23, 2017.
C. Ubeda et al: "Characterization of odour active compounds in strawberry vinegars", Flavour and Fragrance Journal., vol. 27, No. 4, Jul. 24, 2012 (Jul. 24, 2012), pp. 313-321, XP055332147, GB ISSN: 0882-5734, DOI: 10.1002/ffj.3103 p. 319, left-hand column, paragraph 4; table 1.
International Search Report for PCT/IB2016/001305, dated Mar. 17, 2017.
Written Opinion for PCT/IB2016/001305, dated Mar. 17, 2017.
Izumi Yajima et al: "Volatile Flavor Components of Cooked Kaorimai (Scented Rice, *O. sativa japonica*)", Agricultural and Biological Chemistry, vol. 43, No. 12, Dec. 9, 1979 (Dec. 9, 1979), pp. 2425-2429, XP055332700, JP ISSN: 0002-1369, DOI: 10.1080/00021369.1979.10863850 p. 2429, left-hand column, paragraph 4—right-hand column, paragraph 3; table II p. 2425, left-hand coumn, paragraph 3.
Anthony K Q Kamassah et al: "The Physico-chemical Characteristics of Yeast Fermentation of two Mango (*Mangifera indica* Linn) Varieties", Food Science and Quality Management, 2013, pp. 45-56, XP055332697, Retrieved from the Internet: URL:http://s3.amazonaws.com/academia.edu.documents/32789075/The_Physico-chemicalCha racteristics.pdf?AWSAccessKeyId= AKIAJ56TQJRTWSMTNPEA&Expires=1483635133&Signature= RJnKdl0M2nESh0dHc9Xy7Mpwjml=&response-content-disposition= inline; filename=IISTE International Journals 2013 Decemb.pdf [retrieved on Jan. 5, 2017] table 3.
Yutaka Mori et al: "Flavor Components of Miso: Basic Fraction", Agricultural and Biological Chemistry, vol. 47, No. 7, Jul. 1983 (Jul. 1983), pp. 1487-1492, XP055332698, JP ISSN: 0002-1369, DOI: 10.1080/00021369.1983.10865811 tables II, III.
International Search Report for PCT/IB2016/001309, dated Jan. 17, 2017.

* cited by examiner

| Molecule | Salt | | | | Sweet | | | | | Bitterness | Umami |
|---|---|---|---|---|---|---|---|---|---|---|---|
| | Salt Solution (0.2-1.0%) | Maggi (10%-100%) | Kikkomen Soy Sauce (10%-100%) | Cheese sauce (100%) | Sucrose Soluton (2-8%) | Sucrolose Solution (150-300 ppm) | Reb-A Solution (150-300 ppm) | Coke Life (100%) | Sprite ZERO (100%) | Dark Chocolate | Maggi (10%-100%) |
| Pantolactone - dihydro-3-hydroxy-4,4-dimethyl-2(3H)-Furanone | Y | Y | Y | Y | | | Y | Y | Y | Y | |
| Dihydro-5-(hydroxymethyl)-2(3H)-furanone | Y | Y | Y | Y | Y | Y | Y | dnt | dnt | dnt | Y |
| 2-acetyl butyrolactone | Y | Y | Y | Y | Y | Y | Y | dnt | dnt | Y | Y |
| 3-hydroxy-2-pyrone | dnt | Y | Y | dnt | Y | Y | Y | dnt | dnt | dnt | Y |
| 4,6-dimethyl-alpha-pyrone | Y | Y | Y | Y | Y | Y | Y | dnt | dnt | dnt | Y |
| D-Arabino-1,4-lactone | dnt | Y | Y | dnt | Y | Y | Y | dnt | dnt | dnt | Y |
| 4-hydroxy-6-methyl-2-pyrone | Y | Y | Y | Y | Y | Y | Y | dnt | dnt | dnt | Y |
| 3,4-dihydro-6-methyl-2H-pyran-2-one | Y | Y | Y | Y | Y | Y | Y | dnt | dnt | dnt | Y |
| Dihydroactinidiolide | Y | Y | Y | Y | Y | Y | Y | Y | Y | Y | Y |
| 2-acetyl-2-methyl-gamma butyrolactone | Y | Y | Y | Y | Y | Y | Y | dnt | dnt | dnt | Y |

Benchtop Validation of Taste Modulation (applications tested)

dnt = did not test

COMPOSITION COMPRISING TASTE MODULATION COMPOUNDS, THEIR USE AND FOODSTUFF COMPRISING THEM

FIELD OF THE INVENTION

The invention relates to a composition comprising taste modulation compounds, uses of these compositions and foodstuffs comprising them.

BACKGROUND OF THE INVENTION

The flavour industry is continuously seeking ways to enhance, alter or modify the taste of foodstuffs. One way of doing so is the addition of taste modulating compounds which cover a wide spectrum of applications such as improving the perception of sweet, savory, umami, and saltiness; masking bitterness, sourness, astringency and saltiness; and triggering effects such as warming, cooling or the stimulation of saliva.

In US patent application No. 2013/0115356 A1 sclareolide is used to attenuate the liquorice taste associated with stevia while U.S. Pat. No. 4,917,913 recites the use of sclareolide to enhance the organoleptic properties of foodstuffs such as the richness and creaminess of low fat ice cream, sweetness of foodstuffs and beverages which have been sweetened with non-nutritive sweeteners such as aspartame. However, the use of this compound is restricted to such sweeteners.

U.S. Pat. No. 5,683,737 attempts to modulate flavour and taste with glucono-delta lactone, addition of which is required at levels that lead to an accompanying mild acid taste. JP patent application No. 2012-070636A discloses ethyl guaiacol and ethyl furaneol as salt enhancers in soy sauce which can tolerate the smoke and caramel aroma of these compounds which restricts the use of these compounds.

Thus, there is still a need for flavour modifying compounds that do not have the above drawbacks, such as detectable taste or specific application and can be used in a wide variety of foodstuffs and beverages.

BRIEF DESCRIPTION OF DRAWING

FIG. 1—The following flavour modifying compounds have been tested in bench top screening tests: dihydro-3-hydroxy-4,4-dimethyl-2(3H)-furanone (pantolactone), 2-acetyl-butyrolactone, 4,6-dimethyl-alpha-pyrone, 4-hydroxy-6-methyl-2H-pyrone, 3,4-dihydro-6-methyl-2H-pyran-2-one, dihydroactinidiolide, 2-acetyl-2-methyl-gamma-butyrolactone, dihydro-5-(hydroxymethyl)-2(3H)-furanone, 3-hydroxy-2-pyrone, D-arabino-1,4-lactone. The following taste modulations have been tested: salt enhancement, sweet enhancement, bitterness reduction, umami enhancement.

DETAILED DESCRIPTION

The applicant has found that flavour modifying compositions comprising certain flavour modifying compounds can be used in a wide variety of applications for modifying the flavour of foodstuffs and beverages. Thus, the first aspect of the invention relates to a flavour modifying composition comprising one or more flavour modifying compounds according to Formula I

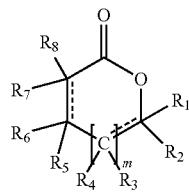

Formula I wherein m is 0 or 1, $R_3$, $R_4$ and $R_7$ are independently selected from hydrogen and linear C1 to C3 alkyl groups, $R_1$ is selected from hydrogen, a linear C1 to C3 alkyl group and —$CH_2OR'$, $R_2$ and $R_6$ are independently selected from hydrogen, linear C1 to C3 alkyl groups or —OR' or $R_2$ and $R_6$ are connected to form a cyclohexane ring which is optionally substituted by a linear C1 to C3 alkyl group, $R_5$ and $R_8$ are independently selected from hydrogen, linear C1 to C3 alkyl groups, —$CH_2OR'$, —CO—R' or —OR', R' is selected from hydrogen or a linear C1 to C3 alkyl group, with the proviso that when the double bond between C2 and C3 is present, $R_5$ and $R_7$ are absent, when m is 1 and the double bond between C4 and C5 is present, $R_3$ and $R_1$ are absent, when m is 0 and the double bond between C2 and C3 is present, $R_2$ and $R_6$ are connected to form the optionally substituted cyclohexane ring.

The term "flavour modifying composition" as used herein is intended to mean that said composition can modify the sensory experience of edible compositions by enhancing, multiplying, potentiating, decreasing, suppressing, or inducing the taste, smell, texture, and/or flavour profiles of a natural or synthetic tastant, flavouring agent, taste profile, flavour profile, and/or texture profile in an animal or a human edible composition. The purpose of such modification is principally to increase the intensity of a desirable attribute, to replace a desirable attribute that is not present or somehow lost in the edible composition, or to decrease the intensity of an undesirable attribute. In particular, it is desirable to increase the intensity in saltiness sensation, sweetness sensation, sourness sensation, kokumi sensation, or umami sensation, or to suppress bitterness sensation. The "flavour modifying composition" can also enhance and/or modify the oral perceptions imparted through chemical sensing of non-fundamental taste properties (which are called "sensate"), including cooling, heat (pain), astringency, metallic, and salivation in the oral cavity. Particularly, the flavour modifying composition can decrease astringency sensation, and/or stimulate salivation (i.e. an increase in mouth moisture).

The term "flavour modifying compounds" as used herein is intended to mean taste modulating compounds and refers to molecules that modify taste and sensate perceptions (and/or sensations). In all cases, the specificity of such compounds is that they do not exhibit perceptible taste and aroma properties (taste-less and aroma-less). Thus, an important distinguishing feature of these "flavour modifying compounds" is that they modulate the flavour perception of a foodstuff, while being imperceptible if consumed alone. Such flavour modifying compounds can be of synthetic origin or natural origin.

Modification of flavour includes the increase in saltiness sensation, increase in sweetness sensation, improvement of sugar-like qualities of high intensity sweeteners, reduction of bitterness and astringency, stimulation of salivation or increase in umami sensation.

According to one embodiment of the invention, the flavour modifying composition comprises one or more flavour modifying compounds according to Formula I wherein
m is 0 or 1,
$R_3$, $R_4$ and $R_7$ are hydrogen,
$R_1$ is selected from hydrogen or a linear C1 to C3 alkyl group,
$R_2$ and $R_6$ are independently selected from hydrogen, linear C1 to C3 alkyl groups or —OR',
$R_5$ and $R_8$ are independently selected from hydrogen, linear C1 to C3 alkyl groups, or —OR',
R' is selected from hydrogen,
with the proviso that
when the double bond between C2 and C3 is present, $R_5$ and $R_7$ are absent,
when m is 1 and the double bond between C4 and C5 is present, $R_3$ and $R_1$ are absent,
when m is 0 and the double bond between C2 and C3 is present, $R_2$ and $R_6$ are connected to form the optionally substituted cyclohexane ring.

According to one embodiment of the invention, the flavour modifying composition comprises one or more flavour modifying compounds according to Formula I wherein
m is 0,
$R_1$, $R_2$, and $R_7$ are hydrogen,
$R_5$ and $R_6$ are methyl,
$R_8$ is a hydroxyl group,
and there is no double bond between C2 and C3.

According to one embodiment of the invention, the flavour modifying composition comprises one or more flavour modifying compounds according to Formula I wherein
m is 1,
$R_3$, $R_4$ and $R_7$ are hydrogen,
$R_1$ is selected from hydrogen and a methyl group,
$R_2$ and $R_6$ are independently selected from hydrogen, a methyl group or —OH,
$R_5$ and $R_8$ are independently selected from hydrogen, linear C1 to C3 alkyl groups, or —OH,
with the proviso that
when the double bond between C2 and C3 is present, $R_5$ and $R_7$ are absent, and there is no double bond between C4 and C5 present.

According to one embodiment of the invention the flavour modifying compound is selected from the group consisting of dihydro-3-hydroxy-4,4-dimethyl-2(3H)-furanone (pantolactone), 2-acetyl-butyrolactone, 4,6-dimethyl-alpha-pyrone, 4-hydroxy-6-methyl-2-pyrone, 3,4-dihydro-6-methyl-2H-pyran-2-one, dihydroactinidiolide, 2-acetyl-2-methyl-gamma-butyrolactone, dihydro-5-(hydroxymethyl)-2(3H)-furanone, 3-hydroxy-2-pyrone, D-arabino-1,4-lactone or mixtures thereof.

The flavour modifying composition is added to the foodstuffs or beverages in such an amount that the flavour modifying compound is present in the foodstuffs or beverages in an amount of 0.1 to 200 ppm, preferably in an amount of 1 to 100 ppm, more preferably in an amount of 3 to 50 ppm and even more preferably in an amount of 5 to 20 ppm.

The terms "foodstuff", "edible compositions" and "food product" as used herein refer to an ingestible product, such as, but not limited to, human food, animal (pet) foods, and pharmaceutical compositions. Examples of foodstuffs may include, but are not limited to, snacks, confections, plant materials and meals which may or may not provide essential nutrients. Plant materials include cacao, cacao beans, coffee, coffee beans and tea leaves or powder. Non-limiting examples of foodstuffs include salad dressings, sauces, gravies, marinades, rubs, nutritional bars, baked goods, breads, caramel, cooked grains, meat products, poultry products, meat, poultry, fowl, fish, sea protein sources, beans, pasta, confectionery products, savoury snacks, dairy products, cheeses, yogurt, butter, margarine, ready to eat cereals, condiments and gravies.

Non-limiting examples of animal foods may include: pet food, dog food, cat food, ferret food, pocket pet food, rodent food, livestock feed, cattle feed, goat feed, pig feed, sheep feed, horse feed and the like. Pet foods such as foods for dogs and cats may be formulated according to the "Fédération européenne de l'industrie des aliments pour animaux familiers (FEDIAF)" or the "American Association of Feed Control Officials (AAFCO)" guidelines. These guidelines assure that pet foods are complete and balanced to meet all nutrient requirements of dogs and cats. Other embodiments of pet foods could include treats made for dogs and cats. These embodiments may not meet complete and balanced nutrient requirements as specified by FEDIAF and AAFCO.

The term "beverage" as used herein means a product that may be consumed orally by a human or animal and which provides water or other nutrients necessary to sustain health of the human or animal. In particular, the term "beverage" includes mixes and concentrates, including but not limited to, alcoholic and non-alcoholic ready to drink and dry powdered beverages. Non-limiting examples of beverages include soda, carbonated drinks, brewed beverages, dairy, drinkable yogurt, milk, coffee whiteners, nutritional drinks, nutritional beverages, soft carbonated beverages, soft non-carbonated fruit flavoured beverages, fountain beverages, frozen ready-to-drink beverages, soft non-carbonated beverages, juices, water, flavoured water, flavoured beverages, carbonated water, syrup, diet beverages, carbonated soft drinks, powdered soft drinks, as well as liquid concentrates (including liquid, frozen, and shelf stable), fountain syrups, cordials, fruit juices, fruit containing beverages, fruit flavoured beverages, vegetable juices, vegetable containing beverages, isotonic beverages, non-isotonic beverages, soft drinks containing a fruit juice, coffee and coffee-based drinks, coffee substitutes, cereal-based beverages, teas, teas including dry mix products as well as ready-to-drink teas (herbal and tea-leaf based), dairy products, soy products, fruit and vegetable juices and juice flavoured beverages as well as juice drinks, juice cocktails, nectars, concentrates, punches, other beverages processed with heating (infusions, pasteurization, ultra high temperature, ohmic heating or commercial aseptic sterilization) and hot-filled packaging, cold-filled products made through filtration, chemical preservation, and other preservation techniques. Particular embodiments of the carbonated beverages may include coke, diet coke, lemon-lime, orange, orange juice, heavy citrus, fruit flavoured, cream sodas, tea or tea-flavoured drinks, and root beer, for example. Particular embodiments of milk can be any suitable form including fat free milk, low fat milk, reduced fat milk, whole milk, powdered milk or a combination thereof.

In a further embodiment of the invention, the flavour modifying composition further comprises a solvent. The solvent not only allows for an exact dosage of the flavour modifying compound to the foodstuffs and beverages but also facilitates an even distribution of the flavour modifying compound in the foodstuffs and beverages.

Suitable solvents may be hydrophilic solvents such as water, propylene glycol, glycerol, ethanol and triacetin or hydrophobic solvents such as vegetable oils, for example palm oil, soybean oil, rapeseed oil, sunflower seed oil, peanut oil, coconut oil, olive oil or medium chain triglycerides (MCT). Medium chain triglycerides are triglycerides based on aliphatic fatty acids comprising 6 to 12 carbon atoms.

In a further embodiment of the invention, the flavour modifying composition further comprises a flavouring ingredient.

The terms "flavouring ingredient" and "flavouring" are intended to be understood as a compound that is recognized by a person skilled in the art as being able to impart or modify in a positive or pleasant way the taste of a composition, and not simply as a compound having a taste. Such a flavour ingredient can be a natural substance, a nature-identical substance or an artificial substance. In general terms, these flavouring ingredients belong to chemical classes as varied as alcohols, aldehydes, ketones, esters, ethers, acetates, nitriles, terpenoids, nitrogenous or sulphurous heterocyclic compounds and essential oils. Many of these co-ingredients are in any case listed in reference texts such as the book by S. Arctander, Perfume and Flavour Chemicals, 1969, Montclair, N.J., USA, or its more recent versions, or in other works of a similar nature, as well as in the abundant patent literature in the field of flavour. The compounds of the present invention can easily be used to replace, either totally or partially, the sugars or sugars substitutes used as sweeteners when used in a foodstuff. By "sugars" or "sugars substitutes as sweeteners" it is meant any monosaccharide such as glucose, fructose, galactose, mannose or glucose, disaccharides such as lactose, sucrose or maltose, polysaccharides such as starch, oligosaccharide, sugar alcohols, corn syrup, high fructose corn syrup, "sugar alcohol" sweeteners such as erythritol, isomalt, lactitol, mannitol, sorbitol, xylitol, maltitol, lactitol, maltodextrin, and the like, or other carbohydrate forms such as gums that are starch based, vegetable based or seaweed based (beta glucan, *psyllium*). Additional sweeteners could include commonly used high intensity sweeteners such as aspartame, saccharin, acesulfame-K, cyclamate, sucralose, alitame, hydrogenated starch hydrolyzate (HSH), stevioside, rebaudioside A, rebaudioside B, rebaudioside C, rebaudioside D, rebaudioside F, rebaudioside G, rebaudioside H and other sweet Stevia-based glycosides, abiziasaponin, abrusosides, in particular abrusoside A, abrusoside B, abrusoside C, abrusoside D, acesulfame potassium, advantame, albiziasaponin, alitame, aspartame, superaspartame, bayunosides, in particular bayunoside 1, bayunoside 2, brazzein, bryoside, bryonoside, bryonodulcoside, carnosifloside, carrelame, curculin, cyanin, chlorogenic acid, cyclamates and its salts, cyclocaryoside I, dihydroquercetin-3-acetate, dihydroflavenol, dulcoside, gaudichaudioside, glycyrrhizin, glycyrrhetinic acid, gypenoside, hematoxylin, hernandulcin, isomogrosides, in particular iso-mogroside V, lugduname, magap, mabinlins, micraculin, mogrosides (lo han guo), in particular mogroside IV and mogroside V, monatin and its derivatives, monellin, mukurozioside, naringin dihydrochalcone (NarDHC), neohesperidin dihydrochalcone (NDHC), neotame, osladin, pentadin, periandrin I-V, perillartine, D-phenylalanine, phlomisosides, in particular phlomisoside 1, phlomisoside 2, phlomisoside 3, phlomisoside 4, phloridzin, phyllodulcin, polpodiosides, polypodoside A, pterocaryosides, rubusosides, saccharin and its salts and derivatives, scandenoside, selligueanin A, siamenosides, in particular siamenoside I, steviolbioside, stevioside and other steviol glycosides, strogines, in particular strogin 1, strogin 2, strogin 4, suavioside A, suavioside B, suavioside G, suavioside H, suavioside I, suavioside J, sucralose, sucronate, sucrooctate, talin, thaumatin, in particular thaumatin I and II, trans-anethol, trans-cinnamaldehyde, trilobatin and D-tryptophane, carrelame and other guanidine-based sweeteners, etc. Sweeteners also include cyclamic acid, mogroside, tagatose, neotame and other aspartame derivatives, D-tryptophan, glycine, isomalt, and hydrogenated glucose syrup (HGS). The term "sweeteners" also includes combinations of sweeteners as disclosed herein.

In a further embodiment of the invention, the flavour modifying composition further comprises one or more additional flavour modifying compounds, different to the one or more flavour modifying compounds of the invention.

In a preferred embodiment of the invention, the flavour modifying composition further comprises at least one compound selected from the group consisting of 5,6-dihydro-4-hydroxy-6-methyl-2H-pyran-2-one, mevalonolactone, 2-methyl-gamma-butyrolactone, 5,6-dihydro-2H-pyran-2-one, 3-methyl-2(5H)-furanone, 5-methoxy-2-pyrrolidinone, hydroxyl-gamma-dodecalactone, massoia lactone, mevanolactone, m-cresol, 3-n-propylphenol, 3-ethylphenol, 2-piperidone, 2-pyrrolidone, pyroglutamic acid, 4-hydroxy-2-pyrrolidinone, N-methylcaprolactam, epsilon-caprolactam and 3-hydroxy-2-pyrone, 9-decen-2-one, and their mixtures thereof. In a particularly preferred embodiment, dihydro-3-hydroxy-4,4-dimethyl-2(3H)-furanone (pantolactone) is used in combination with mevanolactone and/or m-cresol, and/or 3-n-propylphenol. Without being bound by any theory, it is hypothesized that a synergistic effect occurs between the flavour modifying compound(s) of the present invention and the compound(s) selected from the above-mentioned group.

The second aspect of the invention is a product selected from the group of foodstuffs and beverages comprising the flavour modifying composition. In a further embodiment the product comprises the flavour modifying compound of the flavour modifying composition in an amount of 0.1 to 200 ppm, preferably in an amount of 1 to 100 ppm, more preferably in an amount of 3 to 50 ppm and even more preferably or in an amount of 5 to 20 ppm.

The third aspect of the invention is the use of the flavour modifying composition for modifying the perception of sweetness, saltiness, umami, astringency, salivation and bitterness in foodstuffs and beverages.

The fourth aspect of the invention is a method of improving the perception of sweetness, saltiness, umami, astringency, salivation and bitterness in foodstuffs or beverages comprising providing a foodstuff or beverage and adding a flavour modifying composition comprising one or more flavour modifying compounds according for Formula I

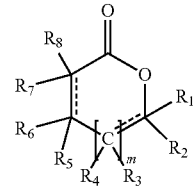

Formula I wherein m is 0 or 1, $R_3$, $R_4$ and $R_7$ are independently selected from hydrogen and linear C1 to C3 alkyl groups, $R_1$ is selected from hydrogen, a linear C1 to C3 alkyl group and —$CH_2OR'$, $R_2$ and $R_6$ are independently selected from hydrogen, C1 to C5 alkyl groups or —OR' or $R_2$ and $R_6$ are connected to form a cyclohexane ring which is optionally substituted by a linear C1 to C3 alkyl group, $R_5$ and $R_8$ are independently selected from hydrogen, linear C1 to C3 alkyl groups, —$CH_2OR'$, —CO—R' or —OR', R' is selected from hydrogen or a linear C1 to C3 alkyl group, with the proviso that when the double bond between C2 and C3 is present, $R_5$ and $R_7$ are absent, when m is 1 and the double bond between C4 and C5 is present, $R_3$ and $R_1$ are absent, when m is 0 and the double bond between C2 and C3 is present, $R_2$ and $R_6$ are connected to form the optionally substituted cyclohexane ring.

In a first embodiment, the present invention provides a method for enhancing saltiness in foodstuffs or beverages.

In a second embodiment, the present invention provides a method for enhancing sweetness and/or improving the sugar-like taste perception of high intensity sweeteners in foodstuffs or beverages.

In a third embodiment, the present invention provides a method for enhancing umami in foodstuffs or beverages.

In a fourth embodiment, the present invention provides a method for reducing astringency in foodstuffs or beverages.

In a fifth embodiment, the present invention provides a method for increasing salivation in foodstuffs or beverages.

In a further embodiment, the present invention provides a method for reducing bitterness in foodstuffs or beverages.

EXAMPLES

Example 1—Impact on Saltiness of Cheese Sauce

All cheese sauce samples were served at 21° C. Samples were stirred by hand prior to portioning to ensure even distribution of components. Approximately 9 ml of cheese sauce was served into odorless, translucent, one-ounce cups labeled with three-digit codes and capped with a lid. The samples were portioned out approximately 45 minutes prior to evaluation.

Panelists evaluated all samples in fully enclosed partitioned booths under white lights. Fizz NETWORK Software Acquisitions Biosystemes 2.478 was used for data collection. Each panelist was provided with filtered water for rinsing and instructed to follow a strict rinsing procedure. The rinsing protocol required panelists to rinse prior to tasting the first sample, and after tasting each sample.

Samples were evaluated using a Deviation from Reference (DFR) method. Panelists were given an identified reference labeled "000" and a coded sample simultaneously. The coded sample was either a blind, coded reference or a coded test sample. The panelists were instructed to taste the reference (000) first and mentally evaluate its SALTINESS intensity. Panelists were then instructed to taste and rate the coded sample's intensity for SALTINESS compared to the identified reference. Sample sets were given to the panelists in balanced, randomized order. A one-minute wait period was enforced between sample sets to reduce flavour carry-over.

Panelists rated SALTINESS intensity difference from the reference using a 9-pt scale anchored with the following descriptors: (−4) Extremely less than Reference, (0) Same as Reference, (4) Extremely more than Reference. Number values were NOT shown on the scale. Statistical mean differences were calculated using one-way ANOVA using Fizz Calculations Biosystemes 2.478. A significance level of $p \leq 0.05$ was set for statistical tests.

TABLE 1

Cheese Sauce Formulas*

| Ingredients | Control (g) | Variant (g) |
| --- | --- | --- |
| Cheese sauce | 1996.0 | 1996.0 |
| Ethanol | 4.0 | — |
| 0.5% Pantolactone in ethanol | — | 2.0 |
| 0.5% 5,6-dihydro-4-hydroxy-6-methyl-2H-pyran-2-one in ethanol | — | 2.0 |
| Total | 2000 | 2000 |

*Ten (10) jars of cheese sauce were combined and then separated into two batches.

Each batch was then dosed according to either the Control or Variant formulation.

The Variant sample was rated significantly MORE SALTY than the Control sample.

Example 2—in Soy Sauce

Maggi Seasoning (manufactured by Nestlé USA, Inc., Glendale, CA; lot #23261124 15) served as the source of liquid savory seasoning. Table 2 shows the ingredients and quantities of the samples.

All samples were served at 21° C. Samples were inverted approx. five times by hand prior to portioning to ensure even distribution of components. Approx. 6 ml of each sample was served into odorless, translucent, one-ounce cups labeled with three-digit codes and capped with a lid. The samples were portioned out approx. one hour prior to evaluation. The test was further carried out as described for Example 1.

TABLE 2

Savory Seasoning Formulations without and with flavour modifying composition

| Ingredients* | Control (g) | Variant (g) |
| --- | --- | --- |
| Maggi Seasoning | 7.50 | 7.50 |
| Water | 92.30 | 92.30 |
| Ethanol | 0.20 | — |
| 0.5% Pantolactone in ethanol | — | 0.10 |
| 0.5% 5,6-dihydro-4-hydroxy-6-methyl-2H-pyran-2-one in ethanol | — | 0.10 |
| Total | 100.00 | 100.00 |

*Maggi seasoning and water were combined and then separated into two batches.

Each batch was then dosed according to either the Control or Variant formulation.

The Control was rated significantly LESS SALTY than the variant.

Example 3—Reduction of Sweetness Taste Threshold

Filtered water (Brita® Basic Faucet Filtration System, model #OPFF-100) was collected into 3.8 L plastic containers and dosed with varying concentrations of either sucrose, Rebaudioside A, or sucralose. Stock solutions of each sweetener were prepared, split in half (by weight), and diluted to achieve the desired concentration levels. Diluted, sweet solutions were then dosed with either 0.2% by weight ethanol (Control) or a combination of 0.1% each of pantolactone and 5,6-dihydro-4-hydroxy-6-methyl-2H-pyran-2-one (Variant). Evaluation of Control and enriched samples was conducted twice (two rounds). Filtered water with 0.2% ethanol served as the 'blank' samples. Samples were prepared approximately 24 h prior to administering to the panel and portioned into odorless, translucent plastic cups and capped. All samples were served at 21 to 22° C. Four threshold scaling sessions were completed for each sweetener: two sessions of the sweetener with ethanol (Control) and two sessions of the sweetener with the flavour modifying composition. Panelists followed procedures as outlined in ASTM method E679-04.

Panelists received a 3-Alternative Forced Choice (AFC) sample set consisting of one sweet and two blank samples in ascending concentration levels. Panelists were instructed to taste the samples and choose the 'sweet' sample. Four 3-AFC sets were presented in a session. A one-minute wait period was enforced in between sample sets and during this time panelists were instructed to rinse their palate three times with filtered water. Evaluations were conducted in fully enclosed partitioned booths under white light. Data were collected using Fizz Network Software Acquisitions Biosystemes 2.478.

Individual sweetener results indicated a lower perception threshold for sucrose, Reb-A and sucralose. Overall results indicated that sweetness perception dropped 53% for sucrose, 34% for Rebaudioside A and 35% for sucralose when a flavour modifying composition was added to the test drinks.

Thus, pantolactone can be used as sweetness enhancer and allows the use of lower amounts of sucrose, sucralose and/or Rebaudioside A.

Example 4—Reduction of Bitterness and Astringency in Dark Chocolate (86% Cocoa) in the Presence Pantolactone and Mevalonolactone Dark chocolate (Lindt® 85% cocoa) was evaluated without (control) and with the above flavour modifying composition (5 ppm pantolactone and 5 ppm mevalonolactone) (test) in a quantitative descriptive analysis. Twenty-four expert panelists consumed either the control dark chocolate or the test dark chocolate (30 sec delay between sample consumption) in either of the following sequences: 1) control first then test or 2) test first then control. The expert panel indicated that when the control was consumed first the test product tasted: 1) less chocolate, 2) less astringent and 3) less bitter. In contrast, the expert panel indicated that when the test was consumed first the test product tasted more chocolate than the control product. Finally, when the data from the previous two evaluations were combined, the test product was perceived as tasting more chocolate. Results confirmed that the sequence order of evaluating the product is important when considering taste perception of taste modulated dark chocolate.

Example 5—Pantolactone and 5,6-Dihydro-4-Hydroxy-6-Methyl-2H-Pyran-2-One Enhancement of Sweetness in Barbeque Seasoned Chips Three types of barbeque seasoned chips were evaluated: 1) Control—15% seasoning dose, 2) Treatment 1—7.5% seasoning dose plus 5 ppm Rebaudioside-A, and 3) Treatment 2—7.5% seasoning dose plus 5 ppm Rebaudioside-A and pantolactone (5 ppm) and 5,6-dihydro-4-hydroxy-6-methyl-2H-pyran-2-one (5 ppm). Five expert tasters consumed one Control barbeque seasoned chip, then consumed one chip of Treatment 1 and one chip of Treatment 2. Results indicated that reduced seasoning dose and 5 ppm Reb-A (Treatment 1) resulted in reduced sweetness and some bitterness on the end of the flavour profile while the addition of pantolactone and 5,6-dihydro-4-hydroxy-6-methyl-2H-pyran-2-one (Treatment 2) amplified cooling sweetness and torula yeast character with less bitterness toward the end of the flavour profile.

TABLE 3

Reduction of Seasoning Replaced by Rebaudioside-A and a Mixture of pantolactone and 5,6-dihydro-4-hydroxy-6-methyl-2H-pyran-2-one

| Treatment | Description | Sweetness score | Observation |
| --- | --- | --- | --- |
| Control | 15% seasoning dosage on chips | 6 | Cooling sweetness |
| Treatment 1 | 7.5% seasoning dosage on chips 5 ppm Rebaudioside-A (97%) | 3 | Some bitterness on back end of flavour profile |
| Treatment 2 | 7.5% seasoning dosage on chips 5 ppm Rebaudioside-A (97%) 5 ppm pantolactone 5 ppm 5,6-dihydro-4-hydroxy-6-methyl-2H-pyran-2-one | 4.5 | Cooling sweetness Increased torula yeast character (complexity via flavour modifying composition action) Backend less bitter |

Example 6—Various Levels of Pantolactone (D-Isomer) Added to Cheese Sauce Enhances Saltiness and Salivation The different concentrations of pantolactone (D-isomer) used in cheese sauce are shown in Table 6. Five expert tasters consumed the Control and then samples comprising various levels of pantolactone (D-isomer). It was concluded that pantolactone (D-isomer) is clean tasting up to 10-12 ppm in cheese sauce. Above 10 to 12 ppm pantolactone increases the bitterness of the cheese sauce, but it still does not exhibit an off-flavour. In water, a content of pantolactone (D-isomer) of 20-25 ppm, is perceived as slightly unclean, but not in an offensive way. It is neutral tasting within the range of sodium enhancement.

TABLE 4

Various Levels of pantolactone (D- isomer) Added to Cheese Sauce

| | Treatment | | | | | |
|---|---|---|---|---|---|---|
| | Control | 1 | 2 | 3 | 4 | 5 |
| Cheese sauce, % | 100 | QS100 | QS100 | QS100 | QS100 | QS100 |
| pantolactone (D-isomer), ppm | 0 | 0.54 | 2.7 | 5.4 | 10.8 | 27 |
| Salivation effect | no | no | yes | yes | yes | yes |
| Saltiness score* | 1 | 1.8 | 2.2 | 2.5 | 3 | 3 ** |

*Saltiness score (1 = low up to 5 = high).
** Becomes bitter with no off-flavour.

Example 7—Pantolactone (D-Isomer) and Mevalonolactone Added to Chicken Broth Five expert tasters consumed the Control (chicken broth) and then chicken broth with either 5 ppm of pantolactone (D-isomer) or 5 ppm of mevalonolactone. Both pantolactone (D-isomer) and mevalonolactone amplify umami taste perception and the combination of both pantolactone (D-isomer) and mevalonolactone results in improved taste with no off-flavours that were perceived as very clean.

TABLE 5

Pantolactone (D-isomer) and mevalonolactone added to Chicken Broth

| Treatment | Observations |
|---|---|
| Control (Broth from Campbell's Chicken Noodle Soup reconstituted 50:50 with water (no noodles)) | Mild salt<br>Mild umami<br>Classic chicken noodle soup<br>Fatty from chicken fat |
| with 5 ppm pantolactone (D-isomer) | Enhanced umami<br>Fatty from chicken fat |
| with 5 ppm mevalonolactone | Enhanced umami<br>Fatty from chicken fat |
| with 5 ppm pantolactone (D-isomer) and 5 ppm mevalonolactone | Delicious<br>Enhanced umami - no off flavours |

Example 8—Pantolactone (D-Isomer) Effect on the Sweetness of Rebaudioside-A

In this example, pantolactone (D-isomer) was added at three concentrations (5, 10, 20 ppm) to water containing either 25 or 250 ppm Rebaudioside-A (Reb-A) to demonstrate the impact on sweetness of the solution.

The product containing either 25 or 250 ppm Reb-A without pantolactone (Control) is compared with the product containing pantolactone (D-isomer) added at either 5, 10 or 20 ppm as noted in Table 6. Three expert tasters tested the Control product and then the product with increasing levels of pantolactone (D-isomer. Increasing levels of pantolactone (D-isomer) added to 250 ppm Reb-A water solutions resulted in a cleaner upfront perception of sweetness with less lingering taste. After tasting increasing levels of pantolacatone (D-isomer) added to 25 ppm Reb-A water solutions tasters reported more sweetness than the control sample at least up to the addition of 20 ppm pantolactone (D-isomer).

TABLE 6

Pantolactone (D-isomer) added at 5, 10, or 15 ppm to water containing either 25 or 250 ppm Reb-A

| Dosage of Reb-A,* ppm | Level of pantolactone (D-isomer), ppm | Taster Observations | | |
|---|---|---|---|---|
| | | Taster 1 | Taster 2 | Taster 2 |
| 250 | 0 | sweet, lingering | sweet, lingering, not offensively bitter - but unclean | sweet, lingering |
| 250 | 5 | sweeter and cleaner, less lingering | sweeter and cleaner | sweeter upfront, cleaner, less lingering |
| 250 | 10 | very sweet in middle | very sweet, cleans-up fast in middle | sweeter upfront, cleaner, less lingering |
| 250 | 20 | so sweet in middle, no linger detected | pure sweet, clean | even sweeter upfront, cleaner, less lingering |

TABLE 6-continued

Pantolactone (D-isomer) added at 5, 10, or 15 ppm to water containing either 25 or 250 ppm Reb-A

| Dosage of Reb-A,* ppm | Level of pantolactone (D-isomer), ppm | Taster Observations | | |
|---|---|---|---|---|
| | | Taster 1 | Taster 2 | Taster 2 |
| 25 | 0 | low sweet | low sweet | no sweetness, but something is their sweeter than control |
| 25 | 5 | sweeter than control | sweeter than control | sweeter than control |
| 25 | 10 | sweetest of 5, 10 and 20 ppm TMC1 | even sweeter than 5 ppm | sweeter than 5 ppm TMC1 |
| 25 | 20 | second sweetest | sweet like 10 ppm | more sweet with a vanilla-like nuance more than control |

*PureCircle Rebaudioside-A 97%

Example 9—Effect of Pantolactone (D-Isomer) and Mevalonolactone on the Heat Perception of Chili Extract Paste Pantolactone (D-isomer) and mevalonolactone were added at 5 ppm to chili extract paste and dissolved in water.

The taste perception of the product without the flavour modifying composition (Control) was compared with the same product (Test) containing the flavour modifying composition. Four expert tasters consumed the chili extract paste solution alone and then the tasters consumed one of two different dilution formats (medium or hot) of the chili extract paste solution containing 5 ppm of either pantolactone (D-isomer) or mevalonolactone. Pantolactone (D-isomer) when added to a chili extract paste resulted in a lower perception of heat and less lingering of heat. It was further concluded that mevalonolactone when added to a chili extract paste resulted in an enhanced perception of fruitiness but no change in the perception of heat.

TABLE 7

Pantolactone (D-isomer) and mevalonolactone impact on heat perception of Chilli extract easte

| Heat/Pain Mitigation | Chilli Paste Extract Dilution in Water (Format) | Concentration/ ppm | Chilli extract paste diluted in water (two levels - hot medium) |
|---|---|---|---|
| Control | NA | 0 | middle and ramping heat at end of profile, lingering heat |
| with added pantolactone (D-isomer) | Medium | 5 | mitigates middle and reducing ramping heat at end of profile, much less lingering heat |
| with added pantolactone (D-isomer) | Hot | 5 | mitigates middle and reducing ramping heat at end of profile, much less lingering heat |
| with added mevalonolactone | Medium | 5 | no effect on middle and ramping heat at end of profile, lingering heat, but chilli profile (fruitiness) is enhanced |
| with added mevalonolactone | Hot | 5 | no effect on middle and ramping heat at end of profile, lingering heat, but chilli profile (fruitiness) is enhanced |

Example 10—Effect of Pantolactone (D-Isomer) and Mevalonolactone on the Sweetness and Bitterness of Milk Chocolate In this example, pantolactone (D-isomer) and mevalonolactone were added at each 5 ppm to milk chocolate to demonstrate the impact on sweetness and bitterness.

The taste perception of the product without the addition of flavour modification compostion (Control) was compared with the same product (Test) containing the flavour modifying composition. Based on the observations of four expert testers it was concluded that pantolactone (D-isomer) when added to milk chocolate resulted in the chocolate being perceived sweeter and less bitter.

TABLE 8

Pantolactone (D-isomer) and mevalonolactone impact on the sweetness and bitterness perception of Milk Chocolate

| Sample | TMC Level, ppm | Hershey's Bliss Chocolate |
| --- | --- | --- |
| Control (milk chocolate only) | 0 | Bitter, dark cocoa with bitter linger, not super high quality cocoa |
| with added pantolactone (D-isomer) | 5 | Sweet, milky chocolate, less bitter, less dark, linger of bitter if greatly modulated and clean; No off-notes |
| with added mevalonolactone | 5 | Sweet, less bitter, less dark, linger of bitter if greatly modulated and clean; No off-notes |

Example 11—Effect of Pantolactone (D-Isomer), Mevalonolactone and a Mixture Thereof on the Complexity and Body of Wine Pantolactone (D-isomer) and mevalonolactone were added individually or as a mixture at 5 ppm each to wine. From the test with four expert tasters it was concluded that pantolactone and mevalonolactone alone as well as in combination resulted in the wine being perceived as being more complex and having more body.

TABLE 9

Pantolactone (D-isomer) and mevalonolactone impact on the perception of the complexity and body of wine

| Complexity addition | Concentration ppm | Box red wine - Vella Burgundy California Table Wine |
| --- | --- | --- |
| Control | 0 | watery red wine, no body, slightly sweet |
| with added pantolactone (D-isomer) | 5 | more complex, (some say more fruity with improved body) |
| with added mevalonolactone | 5 | more complex, improved body |
| with added pantolactone (D-isomer) and mevalonolactone | 5 and 5 | more complex, improved body |

Example 12—Impact of Pantolactone on the Flavour Balance of a Tomato-Based Condiment Ketchup containing sucrose as the base sweetener in two different formulations and ketchup containing sucralose as the base sweetener in a third formulation were evaluated without (control) and with addition of pantolactone added at 5.4 ppm (test). The expert panel of four indicated that the taste of the first sucrose-based ketchup was enhanced in a balanced way and possibly the sweetness was suppressed slightly as evidenced by an increased perception of saltiness. The taste of the second sucrose-based ketchup showed a taste enhancement but not in a balanced way. The taste of the sucralose-based ketchup improved dramatically in all elements with the addition of pantolactone (D-isomer), although the sucralose needs to be significantly reduced in order to be balanced in terms of sweetness.

Results confirmed that well-balanced products are enhanced in their flavour when accompanied by pantolactone (D-isomer).

TABLE 10

Pantolactone (D-isomer) in different ketchup samples

| Product | pantolactone ppm | Observations | | |
| --- | --- | --- | --- | --- |
| | | Ketchup sucrose-based, Source #1 | Ketchup sucrose-based, Source #2 | Ketchup sucralose-based, Source #3 |
| Control (0.1% ethyl alcohol added) | 0 | perfect balance of acidity, tomato, sweetness and spice | different balance of acidity, tomato, sweetness and spice with less spice and more sweetness compared to Source #1 | less than perfect balance of acidity, tomato, sweetness and spice due to strong impact of sucralose and lacking of balanced natural sweetness and acidity |
| Test (0.1% ethyl alcohol containing 5400 ppm pantolactone 1 (D-isomer) | 5.4 | enhanced ketchup, slightly less sweet with full body | increased sweetness and lower acidity, spice is stronger but system is not perfect | sucralose is heightened-but ketchup character remains true-good balance of tomato, spice and acidity with overwhelming artificial sweetness |

Example 13—Pantolactone Enhancing Salt Taste in a Chicken Powder Solution

Chicken powder and sodium chloride were added to filtered water (Brita® Basic Faucet Filtration System, model #OPFF-100) as shown in Table 12. The test was conducted as shown in Example 1.

TABLE 11

Formulas*

| Ingredients | Control (g) | Variant (g) |
|---|---|---|
| Water | 2952.0 | 2952.0 |
| Chicken powder | 30.0 | 30.0 |
| Sodium chloride | 15.0 | 15.0 |
| Ethanol | 3.0 | — |
| 0.5% pantolactone in ethanol | — | 3.0 |
| Total | 3000.0 | 3000.0 |

*Water, chicken powder, and sodium chloride were combined and then separated into two batches. Each batch was then dosed according to either the Control or Variant formulation.

There was a significant difference between chicken powder and sodium chloride in a water solution and chicken powder and sodium chloride in a water solution comprising 5 ppm pantolactone when the Control was presented as the reference. When the Variant sample was presented as the reference, there was not a significant difference in SALTINESS between chicken powder and sodium chloride in a water solution and chicken powder and sodium chloride in a water solution comprising 5 ppm pantolactone.

Example 14—2-Acetyl-Butyrolactone and 4-Hydroxy-6-Methyl-2-Pyrone Enhancing Salt Taste in a Low Sodium Soy Sauce Low sodium soy sauce (Kikkoman's®) was evaluated without and with a water based solution of 2-acetyl-butyrolactone and 4-hydroxy-6-methyl-2-pyrone at 5 ppm concentration. Five expert tasters consumed 1 g low sodium soy sauce alone, then 1 ml of flavour modifying solution, and then again 1 g of the low sodium soy sauce. Results indicated that both 2-acetyl-butyrolactone and 4-hydroxy-6-methyl-2-pyrone amplified saltiness in low sodium soy sauce (see Table 12).

TABLE 12

2-acetyl-butyrolactone and 4-hydroxy-6-methyl-2-pyrone evaluated in Low Sodium Soy Sauce

| Treatment | ppm | Treatment Dose (mg) | Kikkoman's Low Sodium Soy Sauce |
|---|---|---|---|
| Control | 0 | 0 | salty, fermented, soy sauce |
| 2-acetyl-butyrolactone | 5 | 0.005 | slightly amplified saltiness |
| 4-hydroxy-6-methyl-2-pyrone | 5 | 0.005 | amplified saltiness, another candidate |

Example 15—2-Acetyl-Butyrolactone and 4,6-Dimethyl-Alpha-Pyrone Impact on Saltiness of Cheese Sauce Cheese sauce (Ragu®) was evaluated without and with a water based solution of 2-acetyl-butyrolactone and 4,6-dimethyl-alpha-pyrone at 5 ppm concentration. Five expert tasters consumed 20 g cheese sauce alone, then 1 ml of flavour modifying solution, and then again 20 g of cheese sauce. Results indicated that both 2-acetyl-butyrolactone and 4,6-dimethyl-alpha-pyrone amplified saltiness in cheese sauce (see Table 13).

TABLE 13

2-acetyl-butyrolactone and 4,6-dimethyl-alpha-pyrone evaluated in Cheese Sauce

| Treatment | ppm | Treatment Dose (mg) | Cheese Sauce |
|---|---|---|---|
| Control | 0 | 0 | Cheese sauce Modest saltiness |
| with added 2-acetyl-butyrolactone | 5 | 0.005 | Slightly amplified umami Possible heightened saltiness |
| with added 4,6-dimethyl-alpha-pyrone | 5 | 0.005 | Slightly amplified umami |

Example 16—Effect of Pantolactone (D-Isomer), 2-Acetyl-Butyrolactone and 4-Hydroxy-6-Methyl-2-Pyrone on Astringency of a Protein-Enriched Sport Drink In this example, one of pantolactone (D-isomer), 2-acetyl-butyrolactone or 4-hydroxy-6-methyl-2-pyrone were each added at 5 ppm to a protein-enriched sport drink to demonstrate the impact of the flavour modifying solution on astringency.

The taste perception of the product without the flavour modifying solution (Control) is compared with the same product (Test) containing the flavour modifying solution as noted in Table 14. Four expert tasters consumed the protein-enriched sport drink alone and then the tasters consumed the protein-enriched sport drink containing 5 ppm of one of pantolactone (D-isomer), 2-acetyl-butyrolactone or 4-hydroxy-6-methyl-2-pyrone and recorded observations. It was concluded that all flavour modifying compounds/solutions when added to a protein-enriched sport drink resulted in a lower perception of astringency and a lower perception of sucralose aftertaste.

TABLE 14

Pantolactone (D-isomer), 2-acetyl-butyrolactone and 4-hydroxy-6-methyl-2-pyrone impact on Astringency Perception of Protein-Enriched Sport Drink

| Protein fortification - REDUCED ASTRINGENCY | Level, ppm | Observations |
|---|---|---|
| Control (protein-enriched sport drink, chocolate flavoured) | 0 | Chocolate, astringent, sucralose sweet at end |
| with added Pantolactone (D-isomer), | 5 | Reduced astringency, lubricous, clean, full, cocoa with no sucralose linger, Gulpable, Best impact on eliminating sucralose aftertaste |
| with added, 2-acetyl-butyrolactone | 5 | Reduced astringency, lubricious, perceived as creamier, less sucralose aftertaste |
| with added 4-hydroxy-6-methyl-2-pyrone | 5 | Reduced astringency, perceived as creamier, less sucralose aftertaste |

Example 17—Pantolactone, m-Cresol and 3-n-Propylphenol Added to Cheese Sauce Enhances Saltiness and Salivation In this example, various embodiments of Pantolactone, m-cresol and 3-n-propylphenol mixtures added to cheese sauce demonstrate increased saltiness and salivation.

A number of combinations of Pantolactone, m-cresol and 3-n-propylphenol are noted in Table 15. Five expert tasters consumed the Control and then each of the treatments and recorded a score. It was concluded that one of the better blends was 5.40 ppm pantolactone and 100 ppb m-cresol in combination. 3-n-propylphenol is effective, but exhibits flavour aroma character at slightly elevated levels.

TABLE 15

Various Mixtures of Pantolactone, m-cresol and 3-n-propylphenol added to Cheese Sauce

| | Treatment ID | | | | | | |
|---|---|---|---|---|---|---|---|
| | Control | 1 | 2 | A | B | 3 | 4 |
| Formula: | | | | | | | |
| Cheese sauce alone | 100 | QS100 | QS100 | QS100 | QS100 | QS100 | QS100 |
| with added 3-n-propylphenol, ppb | 0 | 0.01 | 0.01 | 0 | 0.01 | 0 | 0.01 |
| with added m-cresol, ppb | 0 | 100 | 100 | 100 | 0 | 100 | 0 |
| with added pantolactone ppb | 0 | 540 | 2700 | 2700 | 2700 | 5400 | 5400 |
| Result: | | | | | | | |
| Salivation effect | no | yes | yes | yes | yes | yes | yes |
| Saltiness score* | 1 | >1 | 2.5 | 3 | 2 | 3.5 | 2.5 |

*Saltiness score: (1 - low . . . 5 - high). Not intended to communicate a magnitude increase since these are relative intensities.

Example 18—Bench Top Screening Tests

The following flavour modifying compounds have been tested (alone) in bench top screening tests: dihydro-3-hydroxy-4,4-dimethyl-2(3H)-furanone (pantolactone), 2-acetyl-butyrolactone, 4,6-dimethyl-alpha-pyrone, 4-hydroxy-6-methyl-2-pyrone, 3,4-dihydro-6-methyl-2H-pyran-2-one, dihydroactinidiolide, 2-acetyl-2-methyl-gamma-butyrolactone, dihydro-5-(hydroxymethyl)-2(3H)-furanone, 3-hydroxy-2-pyrone, D-arabino-1,4-lactone. The following taste modulations have been tested: salt enhancement, sweet enhancement, bitterness reduction, umami enhancement.

Salt—Model Salt Solution—[Ranged from 0.2%-1.2% Salt]

Sodium chloride (NaCl) solutions were used as a source of a liquid salt model. NaCl solutions were evaluated without and with a water based solution of flavour modifying compound, typically at 5 ppm concentration, although tests were also run at 1, 10 and 20 ppm at times. Up to five expert tasters consumed 1 g of NaCl solution alone (control), followed by 1 g of NaCl solution dosed with 1, 5, 10 or 20 ppm flavour modifying compound. Comparison of saltiness intensity was noted and salty taste modulation by the flavour modifying compound was recorded. At each concentration, (1, 5, 10 and 20 ppm of flavour modifying compound) an increase in saltiness sensation is recorded.

Salt—Maggi® (Off-Shelf, Product Produced by Nestle) [Ranged from 10% Diluted to Full Strength]

Maggi® Seasoning (manufactured by Nestlé USA, Inc., Glendale, CA) was used as a source of liquid savory seasoning. Maggi® seasoning liquid was evaluated without and with a water based solution of flavour modifying compound, typically at 5 ppm concentration, although tests were also run at 1, 10 and 20 ppm at times. Up to five expert tasters consumed 1 g of Maggi® alone (control), followed by 1 g of Maggi® dosed with 1, 5, 10 or 20 ppm of flavour modifying compound. Comparison of saltiness intensity was noted and salty taste modulation by the flavour modifying compound was recorded. At each concentration, (1, 5, 10 and 20 ppm of flavour modifying compound) an increase in saltiness sensation is recorded.

Salt—Kikkomen Say Sauce (Full and Low Sodium) [Ranged from 10% Diluted to Full Strength]

Regular and/or low sodium soy sauce (Kikkoman's®) was evaluated without and with a water based solution of flavour modifying compound, typically at 5 ppm concentration, although tests were also run at 1, 10 and 20 ppm at times. Up to five expert tasters consumed 1 g of soy sauce alone (control), followed by 1 g of soy sauce dosed with 1, 5, 10 or 20 ppm flavour modifying compound. Comparison of saltiness intensity was noted and salty taste modulation by the flavour modifying compound was recorded. At each concentration, (1, 5, 10 and 20 ppm of flavour modifying compound) an increase in saltiness sensation is recorded.

Salt—Cheese Sauce

Cheese sauce was purchased at a local grocery store. All cheese sauce samples were served at room temperature (~70° F.). Samples were stirred by hand prior to portioning to ensure even distribution of components. Approximately one ounce of cheese sauce was served into odorless, translucent, one-ounce cups. Up to five expert tasters consumed 5-10 g of cheese sauce alone (control), followed by 5-10 g of cheese sauce dosed with 1, 5, 10 or 20 ppm of flavour modifying compound. Comparison of saltiness intensity was noted and salty taste modulation by the flavour modifying compound was recorded. At each concentration, (1, 5, 10 and 20 ppm of flavour modifying compound) an increase in saltiness sensation is recorded.

Sweet—Model Sucrose Solution [Ranged from 1.0%-12.0% Sucrose]

Filtered water (Brita® Basic Faucet Filtration System) was used for all dilutions. Sucrose solutions were made up as a source of a liquid sweet model. Sucrose solutions were evaluated without and with a water based solution of flavour modifying compound, typically at 5 ppm concentration, although tests were also run at 1, 10 and 20 ppm at times. Up to five expert tasters consumed 10-20 g of sucrose solution alone (control), followed by 10-20 g of sucrose solution dosed with 1, 5, 10 or 20 ppm flavour modifying compound. Comparison of sweetness intensity was noted and sweet taste modulation by the flavour modifying compound was recorded. At each concentration, (1, 5, 10 and 20 ppm of flavour modifying compound) an increase in sweetness sensation is recorded.

Sweet—Sucralose Solution [Ranged from 100 ppm-450 ppm Sucralose]

Filtered water (Brita® Basic Faucet Filtration System) was used for all dilutions. Sucralose solutions were made up as a source of a liquid sweet model. Sucralose solutions were evaluated without and with a water based solution of flavour modifying compound, typically at 5 ppm concentration, although tests were also run at 1, 10 and 20 ppm at times. Up to five expert tasters consumed 10-20 g of sucralose solution alone (control), followed by 10-20 g of sucralose solution dosed with 1, 5, 10 or 20 ppm of flavour modifying compound. Comparison of sweetness intensity was noted and sweet taste modulation by the flavour modifying compound was recorded. At each concentration, (1, 5, 10 and 20 ppm of flavour modifying compound) an increase in sweetness sensation is recorded.

Sweet—Reb-A Solution [Ranged from 100 ppm-450 ppm Reb-A]

Filtered water (Brita® Basic Faucet Filtration System) was used for all dilutions. Reb-A solutions were made up as a source of a liquid sweet model. Sucralose solutions were evaluated without and with a water based solution of flavour modifying compound, typically at 5 ppm concentration, although tests were also run at 1, 10 and 20 ppm at times. Up to five expert tasters consumed 10-20 g of Reb-A solution alone (control), followed by 10-20 g of Reb-A solution dosed with 1, 5, 10 or 20 ppm of flavour modifying compound. Comparison of sweetness intensity was noted and sweet taste modulation by the flavour modifying compound was recorded. At each concentration, (1, 5, 10 and 20 ppm of flavour modifying compound) an increase in sweetness sensation is recorded.

Sweet—Coke Life®-Off Shelf (a Product of Coca Cola Corp.)

Coke Life® (Coca Cola Corp.) was evaluated without and with a water based solution of flavour modifying compound, typically at 5 ppm concentration, although tests were also run at 1, 10 and 20 ppm at times. Up to five expert tasters consumed 20-30 g of Coke Life® alone (control), followed by 20-30 g of Coke Life® dosed with 1, 5, 10 or 20 ppm of flavour modifying compound. Comparison of sweetness intensity was noted and sweet taste modulation by the flavour modifying compound was recorded. At each concentration, (1, 5, 10 and 20 ppm of flavour modifying compound) an increase in sweetness sensation is recorded.

Sweet—Sprite ZERO®-Off Shelf, (a Product of Coca Cola Corp.)

Sprite ZERO® (Coca Cola Corp.) was evaluated without and with a water based solution of flavour modifying compound, typically at 5 ppm concentration, although tests were also run at 1, 10 and 20 ppm at times. Up to five expert tasters consumed 20-30 g of Sprite ZERO® alone (control), followed by 20-30 g of Sprite ZERO® dosed with 1, 5, 10 or 20 ppm of flavour modifying compound. Comparison of sweetness intensity was noted and sweet taste modulation by the flavour modifying compound was recorded. At each concentration, (1, 5, 10 and 20 ppm of flavour modifying compound) an increase in sweetness sensation is recorded.

Bitter—Dark Chocolate

Dark chocolate (Lindt® 85% cocoa) was melted, and used as a base for samples without (control) or with flavour modifying compound added at 5 ppm (test) concentration, although tests were also run at 1, 10 and 20 ppm at times. Up to five expert tasters consumed 10-20 g of chocolate alone (control), followed by 10-20 g of chocolate dosed with 1, 5, 10 or 20 ppm of flavour modifying compound. Comparison of bitterness, sweetness and salivation intensity was noted and taste modulation by the flavour modifying compound was recorded. At each concentration, (1, 5, 10 and 20 ppm of flavour modifying compound) a decrease in bitterness sensation is recorded. Additionally, an increase in sweetness and salivation is recorded.

Umami—Maggi® (Off-Shelf, Product Produced by Nestle) [Ranged from 10% Diluted to Full Strength]

Maggi® Seasoning (manufactured by Nestlé USA, Inc., Glendale, CA) was used as a source of liquid savory seasoning. Maggi® seasoning liquid was evaluated without and with a water based solution of flavour modifying compounds, typically at 5 ppm concentration, although tests were also run at 1, 10 and 20 ppm at times. Up to five expert tasters consumed 1 g of Maggi® alone (control), followed by 1 g of Maggi® dosed with 1, 5, 10 or 20 ppm of flavour modifying compound. Comparison of saltiness intensity was noted and umami taste modulation by the flavour modifying compound was recorded. At each concentration, (1, 5, 10 and 20 ppm of flavour modifying compound) an increase in umami and saltiness sensations is recorded.

The invention claimed is:

1. A flavor modifying composition comprising a taste modulating compound according to Formula I

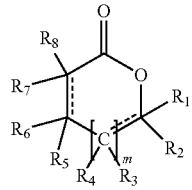

Formula I wherein m is 0 or 1, $R_3$, $R_4$ and $R_7$ are independently selected from the group consisting of hydrogen and linear C1 to C3 alkyl groups, $R_1$ is selected from the group consisting of hydrogen, a linear C1 to C3 alkyl group, and —CH$_2$OR', $R_2$ and $R_6$ are independently selected from the group consisting of hydrogen, linear C1 to C3 alkyl groups, and —OR' or $R_2$ and $R_6$ are connected to form a cycloalkane ring which is optionally substituted by a linear C1 to C3 alkyl group, $R_5$ and $R_8$ are independently selected from the group consisting of hydrogen, linear C1 to C3 alkyl groups, —CH$_2$OR', —CO—R', and —OR', R' is selected from the group consisting of hydrogen and a linear C1 to C3 alkyl group, with the proviso that when the double bond between C2 and C3 is present, $R_5$ and $R_7$ are absent, when m is 1 and the double bond between C4 and C5 is present, $R_3$ and $R_1$ are absent, when m is 0 and the double bond between C2 and C3 is present, $R_2$ and $R_6$ are connected to form the optionally substituted cyclohexane ring, wherein said flavor modifying composition further comprises a solvent selected from the group consisting of water, glycerol, ethanol, triacetin, vegetable oil, palm oil, soybean oil, rapeseed oil, sunflower seed oil, peanut oil, coconut oil, olive oil, and medium chain triglycerides; and wherein the taste modulating compound is selected from the group consisting of 2-acetyl-butyrolactone, 4-hydroxy-6-methyl-2-pyrone, 3,4-dihydro-6-methyl-2H-pyran-2-one, dihydroactinidiolide, 2-acetyl-2-methyl-gamma-butyrolactone, D-arabino-1,4-lactone, and mixtures thereof.

2. The flavor modifying composition according to claim 1, further comprising a flavoring ingredient.

3. The flavor modifying composition according to claim 1, further comprising an additional taste modulating compound that is different than the taste modulating compound of claim 1.

4. The flavor modifying composition according to claim 1, further comprising at least one compound selected from the group consisting of 5,6-dihydro-4-hydroxy-6-methyl-2H-pyran-2-one, mevalonolactone, 2-methyl-gamma-butyrolactone, 5,6-dihydro-2H-pyran-2-one, 3-methyl-2(5H)-furanone, 5-methoxy-2-pyrrolidinone, hydroxyl-gamma-dodecalactone, massoia lactone, m-cresol, 3-n-propylphenol, 3-ethylphenol, 2-piperidone, 2-pyrrolidone, pyroglutamic acid, 4-hydroxy-2-pyrrolidinone, N-methyl-caprolactam, epsilon-caprolactam, 3-hydroxy-2-pyrone, 9-decen-2-one, and mixtures thereof.

5. A product selected from the group consisting of foodstuffs and beverages comprising the flavor modifying composition of claim 1.

6. The product according to claim 5, wherein the taste modulating compound is in an amount of from 0.1 to 200 ppm.

7. The product according to claim 5, wherein the taste modulating compound is in an amount of from 5 to 20 ppm.

8. A method of modifying the perception of sweetness, savory, saltiness, umami, astringency, salivation, or bitterness in in a foodstuff or beverage comprising adding the flavor modifying composition of claim 1 to said foodstuff or beverage.

9. A method of enhancing the perception of sweetness, saltiness, umami, savory, or salivation in a foodstuff or beverage comprising adding the flavor modifying composition of claim 1 to the foodstuff or beverage.

10. A product selected from the group consisting of foodstuffs and beverages comprising the flavor modifying composition of claim 1.

11. The product according to claim 10, wherein the taste modulating compound is in an amount of from 0.1 to 200 ppm.

12. The product according to claim 10, wherein the taste modulating compound is in an amount of from 5 to 20 ppm.

13. A method of masking bitterness, sourness, astringency or saltiness in a foodstuff or beverage comprising adding the flavor modifying composition of claim 1 to the foodstuff or beverage.

14. A product selected from the group consisting of foodstuffs and beverages, said product comprising a flavor modifying composition comprising a taste modulating compound according to Formula I

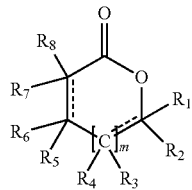

Formula I wherein m is 0 or 1, $R_3$, $R_4$ and $R_7$ are independently selected from the group consisting of hydrogen and linear C1 to C3 alkyl groups, $R_1$ is selected from the group consisting of hydrogen, a linear C1 to C3 alkyl group, and —$CH_2OR'$, $R_2$ and $R_6$ are independently selected from the group consisting of hydrogen, linear C1 to C3 alkyl groups, and —OR' or $R_2$ and $R_6$ are connected to form a cycloalkane ring which is optionally substituted by a linear C1 to C3 alkyl group, $R_5$ and $R_8$ are independently selected from the group consisting of hydrogen, linear C1 to C3 alkyl groups, —$CH_2OR'$, —CO—R', and —OR', R' is selected from the group consisting of hydrogen and a linear C1 to C3 alkyl group, with the proviso that when the double bond between C2 and C3 is present, $R_5$ and $R_7$ are absent, when m is 1 and the double bond between C4 and C5 is present, $R_3$ and $R_1$ are absent, when m is 0 and the double bond between C2 and C3 is present, $R_2$ and $R_6$ are connected to form the optionally substituted cyclohexane ring; and wherein said flavor modifying composition further comprises a solvent selected from the group consisting of water, glycerol, ethanol, triacetin, vegetable oil, palm oil, soybean oil, rapeseed oil, sunflower seed oil, peanut oil, coconut oil, olive oil, and medium chain triglycerides;

wherein the taste modulating compound is selected from the group consisting of 2-acetyl-butyrolactone, 4-hydroxy-6-methyl-2-pyrone, 3,4-dihydro-6-methyl-2H-pyran-2-one, dihydroactinidiolide, 2-acetyl-2-methyl-gamma-butyrolactone, D-arabino-1,4-lactone, and mixtures thereof; and wherein said taste modulating compound is in an amount of from 0.1 to 200 ppm.

15. The product according to claim 14, wherein the taste modulating compound is in an amount of from 5 to 20 ppm.

16. The flavor modifying composition according to claim 1 wherein said taste modulating compound does not exhibit any perceptible taste or aroma properties.

17. The product according to claim 14 wherein said taste modulating compound does not exhibit any perceptible taste or aroma properties.

18. A flavor modifying composition comprising a taste modulating compound according to Formula I

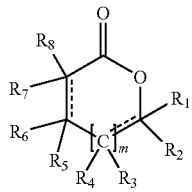

Formula I wherein
m is 0 or 1,
$R_3$, $R_4$ and $R_7$ are independently selected from the group consisting of hydrogen and linear C1 to C3 alkyl groups,
$R_1$ is selected from the group consisting of hydrogen, a linear C1 to C3 alkyl group and —$CH_2OR'$,
$R_2$ and $R_6$ are independently selected from the group consisting of hydrogen, linear C1 to C3 alkyl groups, and —OR' or $R_2$ and $R_6$ are connected to form a cycloalkane ring which is optionally substituted by a linear C1 to C3 alkyl group,
$R_5$ and $R_8$ are independently selected from the group consisting of hydrogen, linear C1 to C3 alkyl groups, —$CH_2OR'$, —CO—R', and —OR',
R' is selected from the group consisting of hydrogen and a linear C1 to C3 alkyl group, with the proviso that
when the double bond between C2 and C3 is present, $R_5$ and $R_7$ are absent,
when m is 1 and the double bond between C4 and C5 is present, $R_3$ and $R_1$ are absent,
when m is 0 and the double bond between C2 and C3 is present, $R_2$ and $R_6$ are connected to form the optionally substituted cyclohexane ring, wherein said flavor modifying composition further comprises a solvent selected from the group consisting of water, glycerol, ethanol, triacetin, vegetable oil, palm oil, soybean oil, rapeseed oil, sunflower seed oil, peanut oil, coconut oil, olive oil, and medium chain triglycerides;
wherein the taste modulating compound is selected from the group consisting of 2-acetyl-butyrolactone, 4-hydroxy-6-methyl-2-pyrone, 3,4-dihydro-6-methyl-2H-pyran-2-one, dihydroactinidiolide, 2-acetyl-2-methyl-gamma-butyrolactone, D-arabino-1,4-lactone, and mixtures thereof; and
wherein said taste modulating compound does not exhibit any perceptible taste or aroma properties.

19. The product of claim 14, further comprising at least one compound selected from the group consisting of 5,6-dihydro-4-hydroxy-6-methyl-2H-pyran-2-one, 2-methyl-gamma-butyrolactone, 5,6-dihydro-2H-pyran-2-one, 3-methyl-2(5H)-furanone, 5-methoxy-2-pyrrolidinone, hydroxyl-gamma-dodecalactone, massoia lactone, mevanolactone, m-cresol, 3-n-propylphenol, 3-ethylphenol, 2-piperidone, 2-pyrrolidone, pyroglutamic acid, 4-hydroxy-2-pyrrolidinone, N-methylcaprolactam, epsilon-caprolactam, 3-hydroxy-2-pyrone, 9-decen-2-one, and mixtures thereof.

20. The flavor modifying composition of claim 18, further comprising at least one compound selected from the group consisting of 5,6-dihydro-4-hydroxy-6-methyl-2H-pyran-2-one, 2-methyl-gamma-butyrolactone, 5,6-dihydro-2H-pyran-2-one, 3-methyl-2(5H)-furanone, 5-methoxy-2-pyrrolidinone, hydroxyl-gamma-dodecalactone, *massoia* lactone, mevanolactone, m-cresol, 3-n-propylphenol, 3-ethylphenol, 2-piperidone, 2-pyrrolidone, pyroglutamic acid, 4-hydroxy-2-pyrrolidinone, N-methylcaprolactam, epsilon-caprolactam, 3-hydroxy-2-pyrone, 9-decen-2-one, and mixtures thereof.

* * * * *